(12) United States Patent
Frieder et al.

(10) Patent No.: US 11,106,878 B2
(45) Date of Patent: *Aug. 31, 2021

(54) GENERATING HYPOTHESES IN DATA SETS

(71) Applicant: Georgetown University, Washington, DC (US)

(72) Inventors: Ophir Frieder, Chevy Chase, MD (US); David Hartley, Washington, DC (US)

(73) Assignee: Georgetown University, Washington, DC (US)

( * ) Notice: Subject to any disclaimer, the term of this patent is extended or adjusted under 35 U.S.C. 154(b) by 1413 days.

This patent is subject to a terminal disclaimer.

(21) Appl. No.: 15/242,325

(22) Filed: Aug. 19, 2016

(65) Prior Publication Data

US 2016/0358087 A1 Dec. 8, 2016

Related U.S. Application Data

(63) Continuation-in-part of application No. 14/597,652, filed on Jan. 15, 2015, now Pat. No. 10,521,727.

(60) Provisional application No. 61/927,532, filed on Jan. 15, 2014.

(51) Int. Cl.
| | |
|---|---|
| *G06N 5/00* | (2006.01) |
| *G06N 5/02* | (2006.01) |
| *G06N 3/12* | (2006.01) |
| *G06F 40/40* | (2020.01) |
| *G06N 7/00* | (2006.01) |

(52) U.S. Cl.
CPC ............. *G06F 40/40* (2020.01); *G06N 3/126* (2013.01); *G06N 5/003* (2013.01); *G06N 5/022* (2013.01); *G06N 7/005* (2013.01)

(58) Field of Classification Search
CPC ......... G06N 3/126; G06N 5/003; G06N 5/022
See application file for complete search history.

(56) References Cited

U.S. PATENT DOCUMENTS

| | | | | |
|---|---|---|---|---|
| 5,544,280 | A * | 8/1996 | Liu | ...................... G06N 3/0675 706/18 |
| 6,523,026 | B1 * | 2/2003 | Gillis | .................. G06F 16/3332 |
| 6,792,419 | B1 * | 9/2004 | Raghavan | ............. G06F 16/951 |
| 7,292,960 | B1 * | 11/2007 | Srinivasa | ............... G06Q 10/06 702/185 |
| 9,667,514 | B1 | 5/2017 | Wagner, Jr. et al. | |
| 2003/0212649 | A1 * | 11/2003 | Denesuk | ............... G06F 16/951 |

(Continued)

OTHER PUBLICATIONS

International Search Report and Written Opinion dated Aug. 19, 2019; International Application No. PCT/US2019/034824; International Filing Date: May 31, 2019; 10 pages.

(Continued)

*Primary Examiner* — Ben M Rifkin
(74) *Attorney, Agent, or Firm* — Blank Rome LLP

(57) ABSTRACT

A method for generating hypotheses in a corpus of data comprises selecting a form of ontology; coding the corpus of data based on the form of the ontology; generating ontology space based on coding results and the ontology; transforming the ontology space into a hypothesis space by grouping hypotheses; weighing hypotheses included in the hypothesis space; and applying a science-based optimization algorithm configured to model a science-based treatment of the weighted hypotheses.

17 Claims, 18 Drawing Sheets

(56) References Cited

U.S. PATENT DOCUMENTS

| | | | | |
|---|---|---|---|---|
| 2009/0187525 | A1* | 7/2009 | Agrawal | G16B 40/00 706/50 |
| 2010/0228731 | A1* | 9/2010 | Gollapudi | G06F 16/955 707/737 |
| 2012/0096042 | A1* | 4/2012 | Brockett | G06F 16/24534 707/798 |
| 2012/0179421 | A1* | 7/2012 | Dasgupta | G05B 23/0281 702/181 |
| 2013/0238356 | A1* | 9/2013 | Torii | G06Q 10/06 705/2 |
| 2015/0058344 | A1 | 2/2015 | Bhatia et al. | |
| 2017/0075877 | A1 | 3/2017 | Lepeltier | |

OTHER PUBLICATIONS

Gerald Whitaker et al.; "A hybrid genetic algorithm for multiobjective problems with activity analysis-based local search"; 2009 [online]; Downloaded Aug. 6, 2019; https://pubag.nal.usda.gov/download/22943/PDF (Year: 2009).

Donald Jones, A taxonomy of Global Optimization Methods based on Response Surfaces:; 2001 [online] Downloaded Aug. 6, 2019; ;https://rd.springer.com/content/pdf/10.1023%2FA%3A1012771025575.pd (Year: 2001).

ManzZup "Array, Vector and Stack Data Structures for Absolute Beginners"; Verified by wayback machine to Mar. 2013. [online]; Downloaded https://web.archive.org/web/20130428200256/https://ww.go4expert.com/articles/array-vector-stack-data-structures-t27921.

"On Some Feature Selection Strategies for Spam Filter Design", Ren Wang. Amr. M. Youssef, Ahmed K. Elhakeen, Electrical and Computer Engineerin, CCECE '06. Canadian Conference on May 7-10, 2006, pp. 2155-2158.

* cited by examiner

FIG. 4(a)

{Field(1), Field(2), ... , Field(n)}

FIG. 4(b)

{subject, verb, object}

FIG. 6

| Hypothesis # | Where | What | How |
|---|---|---|---|
| 1 | Pittsburgh | tornado | wind |
| 2 | Carmichaels | tornado | wind |
| 3 | New York | tornado | wind |
| 4 | Cincinnati | tornado | wind |
| 5 | San Francisco | tornado | wind |
| 6 | Pittsburgh | hurricane | wind |
| 7 | Carmichaels | hurricane | wind |
| 8 | New York | hurricane | wind |
| 9 | Cincinnati | hurricane | wind |
| 10 | San Francisco | hurricane | wind |
| 11 | Pittsburgh | tsunami | wind |
| 12 | Carmichaels | tsunami | wind |
| 13 | New York | tsunami | wind |
| 14 | Cincinnati | tsunami | wind |
| 15 | San Francisco | tsunami | wind |
| 16 | Pittsburgh | storms | wind |
| 17 | Carmichaels | storms | wind |
| 18 | New York | storms | wind |
| 19 | Cincinnati | storms | wind |
| 20 | San Francisco | storms | wind |
| 21 | Pittsburgh | earthquake | wind |
| 22 | Carmichaels | earthquake | wind |
| 23 | New York | earthquake | wind |
| 24 | Cincinnati | earthquake | wind |
| 25 | San Francisco | earthquake | wind |

FIG. 7

| Document # | Source | SampleCity | SampleSubject | SampleCause | SampleVerb | SampleObject |
|---|---|---|---|---|---|---|
| 1 | UPI | New York | storms | lightning | burned down | trailerpark |
| 2 | CNN | San Francisco | tornado | wind | blewdown | house |
| 3 | NPR | New York | earthquake | shaking | leveled | skyscraper |
| 4 | CNN | New York | hurricane | rain | washed away | house |
| 5 | Bloomberg | New York | tornado | wind | blewdown | tent |
| 6 | CBS | Pittsburgh | storms | wind | leveled | house |
| 7 | UPI | Pittsburgh | storms | lightning | burned down | house |
| 8 | UPI | Pittsburgh | tornado | wind | blewdown | trailerpark |
| 9 | CNN | New York | tornado | rain | washed away | house |
| 10 | CNN | Pittsburgh | tornado | wind | burned down | trailerpark |
| 11 | Bloomberg | Carmichaels | hurricane | wind | blewdown | trailerpark |
| 12 | CNN | Pittsburgh | hurricane | lightning | washed away | tent |
| 13 | Bloomberg | New York | hurricane | flooding | burned down | tent |
| 14 | UPI | New York | tsunami | flooding | blewdown | trailerpark |
| 15 | UPI | New York | hurricane | shaking | destroyed | tent |
| 16 | Bloomberg | Carmichaels | earthquake | flooding | blewdown | igloo |
| 17 | NPR | Pittsburgh | storms | flooding | washed away | house |
| 18 | NPR | Pittsburgh | storms | rain | washed away | tent |
| 19 | Bloomberg | New York | tornado | wind | blewdown | tent |
| 20 | CBS | Pittsburgh | tornado | lightning | burned down | tent |
| 21 | Bloomberg | New York | hurricane | flooding | blewdown | house |
| 22 | CBS | Pittsburgh | hurricane | lightning | blewdown | house |
| 23 | NPR | Carmichaels | tornado | rain | washed away | trailerpark |

FIG. 8

| Document # | Where | What | How |
|---|---|---|---|
| 1 | New York | storms | lightning |
| 2 | San Francisco | tornado | wind |
| 3 | New York | earthquake | shaking |
| 4 | New York | hurricane | rain |
| 5 | Pittsburgh | tornado | rain |
| 6 | Carmichaels | storms | wind |
| 7 | Pittsburgh | storms | wind |
| 8 | Pittsburgh | tornado | lightning |
| 9 | New York | tornado | wind |
| 10 | Pittsburgh | tornado | rain |
| 11 | Carmichaels | hurricane | wind |
| 12 | Pittsburgh | hurricane | wind |
| 13 | New York | hurricane | lightning |
| 14 | New York | tsunami | flooding |
| 15 | New York | hurricane | flooding |
| 16 | Carmichaels | earthquake | shaking |
| 17 | Pittsburgh | storms | flooding |
| 18 | Pittsburgh | storms | flooding |
| 19 | New York | tornado | rain |
| 20 | Pittsburgh | tornado | wind |
| 21 | New York | tornado | lightning |
| 22 | Pittsburgh | hurricane | flooding |
| 23 | Carmichaels | tornado | rain |

FIG. 9

| Document # | Where | What | How | Type of place |
|---|---|---|---|---|
| 1 | New York | storms | lightning | urban |
| 2 | San Francisco | tornado | wind | urban |
| 3 | New York | earthquake | shaking | urban |
| 4 | New York | hurricane | rain | urban |
| 5 | Pittsburgh | tornado | rain | urban |
| 6 | Carmichaels | storms | wind | rural |
| 7 | Pittsburgh | storms | wind | urban |
| 8 | Pittsburgh | tornado | lightning | urban |
| 9 | New York | tornado | wind | urban |
| 10 | Pittsburgh | tornado | rain | urban |
| 11 | Carmichaels | hurricane | wind | rural |
| 12 | Pittsburgh | hurricane | wind | urban |
| 13 | New York | hurricane | lightning | urban |
| 14 | New York | tsunami | flooding | urban |
| 15 | New York | hurricane | flooding | urban |
| 16 | Carmichaels | earthquake | shaking | rural |
| 17 | Pittsburgh | storms | flooding | urban |
| 18 | Pittsburgh | storms | flooding | urban |
| 19 | New York | tornado | rain | urban |
| 20 | Pittsburgh | tornado | wind | urban |
| 21 | New York | tornado | lightning | urban |
| 22 | Pittsburgh | hurricane | flooding | urban |
| 23 | Carmichaels | tornado | rain | rural |

FIG. 10

| Hypothesis # | Weighting |
|---|---|
| 1 | 10 |
| 2 | 8 |
| 3 | 12 |
| 4 | 2 |
| 5 | 2 |
| 6 | 16 |
| 7 | 11 |
| 8 | 5 |
| 9 | 2 |
| 10 | 3 |
| 11 | 0 |
| 12 | 0 |
| 13 | 0 |
| 14 | 0 |
| 15 | 0 |
| 16 | 15 |
| 17 | 4 |
| 18 | 0 |
| 19 | 4 |
| 20 | 1 |
| 21 | 0 |
| 22 | 0 |
| 23 | 0 |
| 24 | 0 |

FIG. 18

Table I

| City | Subject | Cause | Verb | Object | Source |
|---|---|---|---|---|---|
| Pittsburgh | tornado | wind | blew down | trailorpark | CNN |
| Carmichael | hurricane | rain | washing away | house | UPI |
| New York | tsunami | flooding | destroyed | skyscraper | NPR |
| Cincinnati | storms | lightning | burned down | tent | CBS |
| San Francisco | earthquake | shaking | leveled | igloo | Bloomberg |

GENERATING HYPOTHESES IN DATA SETS

CROSS REFERENCE TO RELATED APPLICATIONS

This application is a continuation-in-part of U.S. patent application Ser. No. 14/597,652, filed Jan. 15, 2015, which claims priority to U.S. Provisional Patent Application No. 61/927,532, filed Jan. 15, 2014, both of which are incorporated by reference herein in their entirety.

FIELD

This present disclosure relates generally to a system, method, and storage medium for data analysis.

BACKGROUND

The total amount of digital information on global networks is increasing exponentially. The service and information provided by the networks have grown from just emails to discussion forums, instant messaging, news reporting, content sharing, social networking, online shopping, publication, library, opinion polling, cloud services, and so on. A human is not capable of reviewing every piece of information from this sea of information and quickly identifying all relevant data for a given subject or project. Technologies employing artificial intelligence have been developed to ease the data mining and reviewing tasks to assist human users and digital agents to quickly discover relevant data from large data sets, knowledge stores, and associated computer networks.

The demand for processing large amounts of digital data in real time is particularly heightened in the area of national security. Agencies faced with on-going digital and physical threats from various parts of the world are tasked with warning communities before an attack, implementing emergency preparedness, securing borders and transportation arteries, protecting critical infrastructure and key assets, and defending against catastrophic terrorism. What is most critical to achieve these tasks is an agency's capability to detect potential attacks early on and monitor such plots continuously before they are carried out. The data on global networks can potentially give an information seeking organization all the information they need. However, the key question is how to effectively and carefully sort and search vast amount of data.

Similar demands also exist in other surveillance areas including public health, public opinion, consumer products, and morale.

Current practices in identifying information of interest from a large amount of data includes the use of keyword searches to look for specific information, the use of Bayesian classifiers to divide information, and the use of logistic regression to look for risk factors of predefined or desired outcomes. These practices, by their nature, however cannot identify surprises, latest developments, or novel plots because these searches rely on a human conceived and defined set of interests or knowledge that a computer-aided search treats as a priori knowledge. This pre-set boundary limits the capability of a search to detect and identify unexpected events.

SUMMARY

To overcome the issues associated with current hypothesis generation techniques, the present disclosure presents a computer implemented method that allows the data itself to define a space of possible hypotheses, which optionally merges and groups similar hypotheses, and then weights and selects a subset of relevant hypotheses for further consideration by a human analyst. The computerized method uses a theoretical and physical basis to implement hypothesis generation. Specifically, a simulated annealing technique is applied and provides an understood, validated theoretical construct by which the problem of hypothesis generation can be solved. A weighing algorithm is applied that expresses the goal as an optimization problem. Moreover, this end-to-end approach is easily communicated due to the physics-based analogue, which is applicable to textual, audio, and video data, executable in real time or near-real time, and scalable to realistic applications. The method is also domain agnostic; namely, the method is generalized and interoperable among various systems or domains.

According to some embodiments, disclosed is a method for generating hypotheses in a corpus of data. The method comprises selecting a form of ontology configured as one or more ontology vectors; coding the corpus of data based on the form of the ontology vector; generating an ontology space based on coding results and the ontology form; transforming the ontology space into a hypothesis space by grouping hypotheses; weighing the hypotheses included in the hypothesis space; and applying a random-walk process configured to model a physics-based treatment process to the weighing results of the hypotheses.

According to some embodiments, the random-walk process is guided to explore hypotheses less likely to be anticipated. That is, hypotheses that are anticipated with a greater degree of expectation are discarded in favor of exploring unanticipated hypotheses. That is, the random walk favors, without loss of generality, nonintuitive, nonconventional, and potentially, but not necessarily, hypotheses within the hypothesis space that have a low probability of occurrence.

According to another embodiment, the random-walk process is configured as a simulated annealing process.

According to yet another embodiment, the ontology space and the hypothesis space are fully computer-generated.

According to yet another embodiment, a hypothesis surface of the hypothesis space includes troughs whose depth indicates relevancy of a hypothesis neighborhood.

According to yet another embodiment, the method further comprises presenting a color map associated with the hypothesis space whose color brightness indicates the relevancy of a hypothesis neighborhood.

According to yet another embodiment, the method further comprises presenting an R-dimensional space representation projected onto a lower dimensional space, namely, an S-dimensional space where S<R.

According to yet another embodiment, the method further comprises identifying global minima as the relevant hypothesis or hypotheses.

According to yet another embodiment, the random-walk process is applied repeatedly with an increased hop-distance each time.

According to another embodiment, the random-walk process is configured as a genetic algorithm process.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present application is intended to include all such aspects and their equivalents. Other advantages, embodiments and novel features of the invention may become apparent from the following description of the present invention when considered in conjunction with the drawings. The following description, given by way of example, but not intended to limit the present invention solely to the specific embodiments described, may best be understood in conjunction with the accompanying drawings, in which:

FIG. 4(a) illustrates an embodiment of ontology.

FIG. 4(b) illustrates another embodiment of ontology.

FIG. 6 illustrates an embodiment of ontology space.

FIG. 7 illustrates an embodiment of ontology space.

FIG. 8 illustrates an embodiment of a hypothesis space.

FIG. 9 illustrates an embodiment of a hypothesis space.

FIG. 10 illustrates an embodiment of a ranked hypothesis space.

FIG. 18 is a table illustrating a hypothetical corpus of information that can be collected.

DETAILED DESCRIPTION

Figure 1:
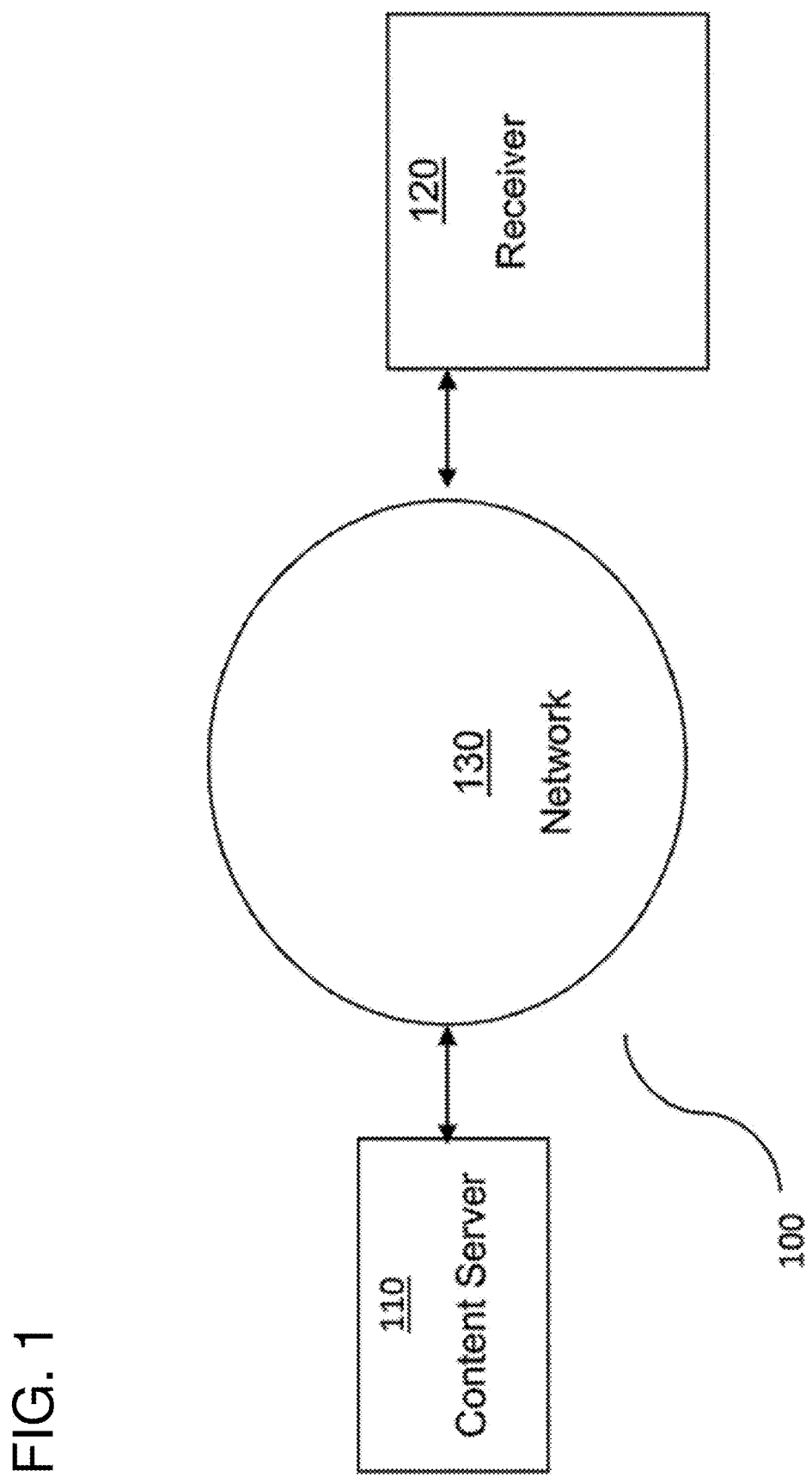
FIG. 1 illustrates an embodiment of a network.

Those of ordinary skill in the art will realize that the description of the present application is illustrative only and not in any way limiting. Other embodiments of the invention will readily suggest themselves to such skilled persons, having the benefit of this disclosure. Reference will be made in detail to specific implementations of the present application as illustrated in the accompanying drawings.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory or a storage medium that can direct a computer or other programmable apparatus to function in a particular manner, such that the instructions stored in the computer-readable memory or storage medium produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Ruby, Python, Pascal, SmallTalk, FORTRAN, assembly language, and the like, may be used to implement aspects of the present application. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" or "storage medium" can be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, a compact flash card, a smart media cart, a SMS card, any other magnetic medium, a CD-ROM, a DVD, or any other optical medium.

The term "ontology" can be understood to represent a formal conceptualization of a particular domain of interests or a definition of an abstract, view of a world a user desires to present. Such conceptualization or abstraction is used to provide a complete or comprehensive description of events, interests, or preferences from the perspective of a user who tries to understand and analyze a body of information.

Each element comprising the ontology can be weighted to have a greater or lesser value in accordance with its significance. Default weights are assumed if unspecified.

The term "hypothesis" can be understood to represent a specific description or example extracted, according to the form of ontology, from a body of information, which are collected to find certain events, interests, or preferences. If ontology is deemed as genus, then a hypothesis may be deemed as species. The content described in a hypothesis may be true, potentially true, potentially false, or false or may be relevant or unrelated to those events, interests, or preferences that are sought by a user. Thus, relevant hypotheses that may be interested by a user need to be detected from all possible hypotheses generated from the body of information. Succinctly stated, a hypothesis makes a statement of a tentative explanation for an observation that can be tested by further investigation. Hypotheses may be true, potentially true, potentially false or false.

Each hypothesis can be assigned a rank. This rank can be computed either in a stateless manner or based on the path by which it was discovered, namely based on its path history. Stateless evaluations consider only the current position of the exploration whereas historical evaluations evaluate the previous positions, namely states, which were previously traversed to reach the current state.

FIG. 1 depicts an exemplary networked environment 100 in which systems and methods, consistent with exemplary embodiments, may be implemented. As illustrated, networked environment 100 may include a content server 110, a receiver 120, and a network 130. The exemplary simplified number of content servers 110, receivers 120, and networks 130 illustrated in FIG. 1 can be modified as appropriate in a particular implementation. In practice, there may be additional content servers 110, receivers 120, and/or networks 130.

In certain embodiments, a receiver 120 may include any suitable form of multimedia playback device, including, without limitation, a computer, a gaming system, a cable or satellite television set-top box, a DVD player, a digital video recorder (DVR), or a digital audio/video stream receiver, decoder, and player. A receiver 120 may connect to network 130 via wired and/or wireless connections, and thereby communicate or become coupled with content server 110, either directly or indirectly. Alternatively, receiver 120 may be associated with content server 110 through any suitable tangible computer-readable media or data storage device (such as a disk drive, CD-ROM, DVD, or the like), data stream, file, or communication channel.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 100 may perform one or more of the tasks described as being performed by one or more other components of networked environment 100.

Figure 2:
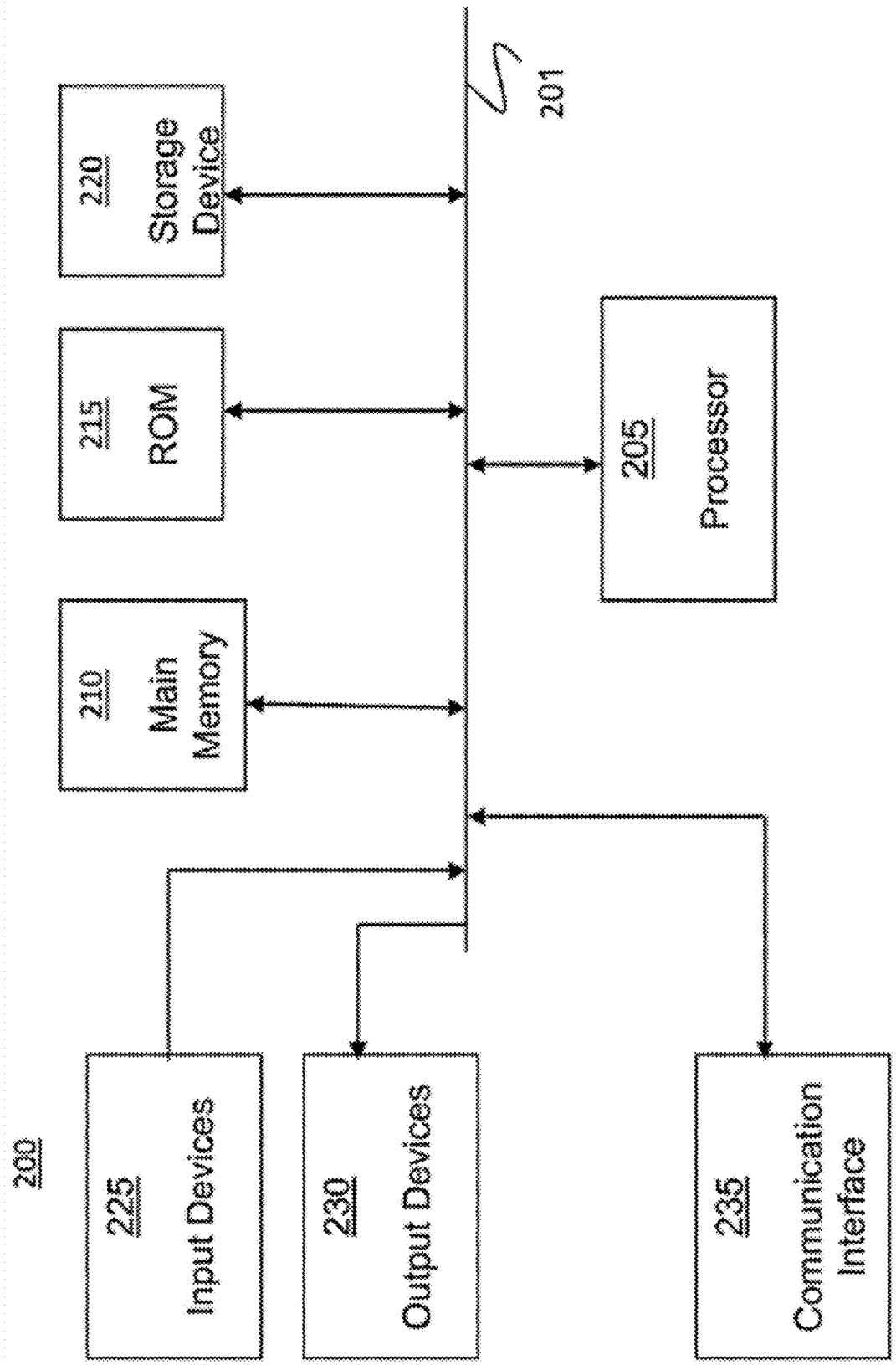
FIG. 2 illustrates an embodiment of a computer device.

FIG. 2 is an exemplary diagram of a computing device 200 that may be used to implement aspects of certain embodiments of the present application, such as aspects of content server 110 or of receiver 120. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Moreover, processor 205 may include processors with multiple cores. Also, processor 205 may be multiple processors. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, touchscreen display, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 130 as shown in FIG. 1.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present application. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 130 shown in FIG. 1, such as Microsoft's Internet Explorer browser, Mozilla's Firefox browser, Apple's Safari browser, Google's Chrome browser or any other commercially available or customized browsing or other application software capable of communicating with network 130. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 130. For example, source data or other information received from devices connected to the network 130 may be output via the browser. Also, both the browser and the browser assistant are capable of performing operations on the received source information prior to outputting the source information. Further, the browser and/or the browser assistant may receive user input and transmit the inputted data to devices connected to network 130.

Similarly, certain embodiments of the present application described herein are discussed in the context of the global data communication network commonly referred to as the Internet. Those skilled in the art will realize that embodiments of the present application may use any other suitable data communication network, including without limitation direct point-to-point data communication systems, dial-up networks, personal or corporate Intranets, proprietary networks, or combinations of any of these with or without connections to the Internet.

Figure 3:
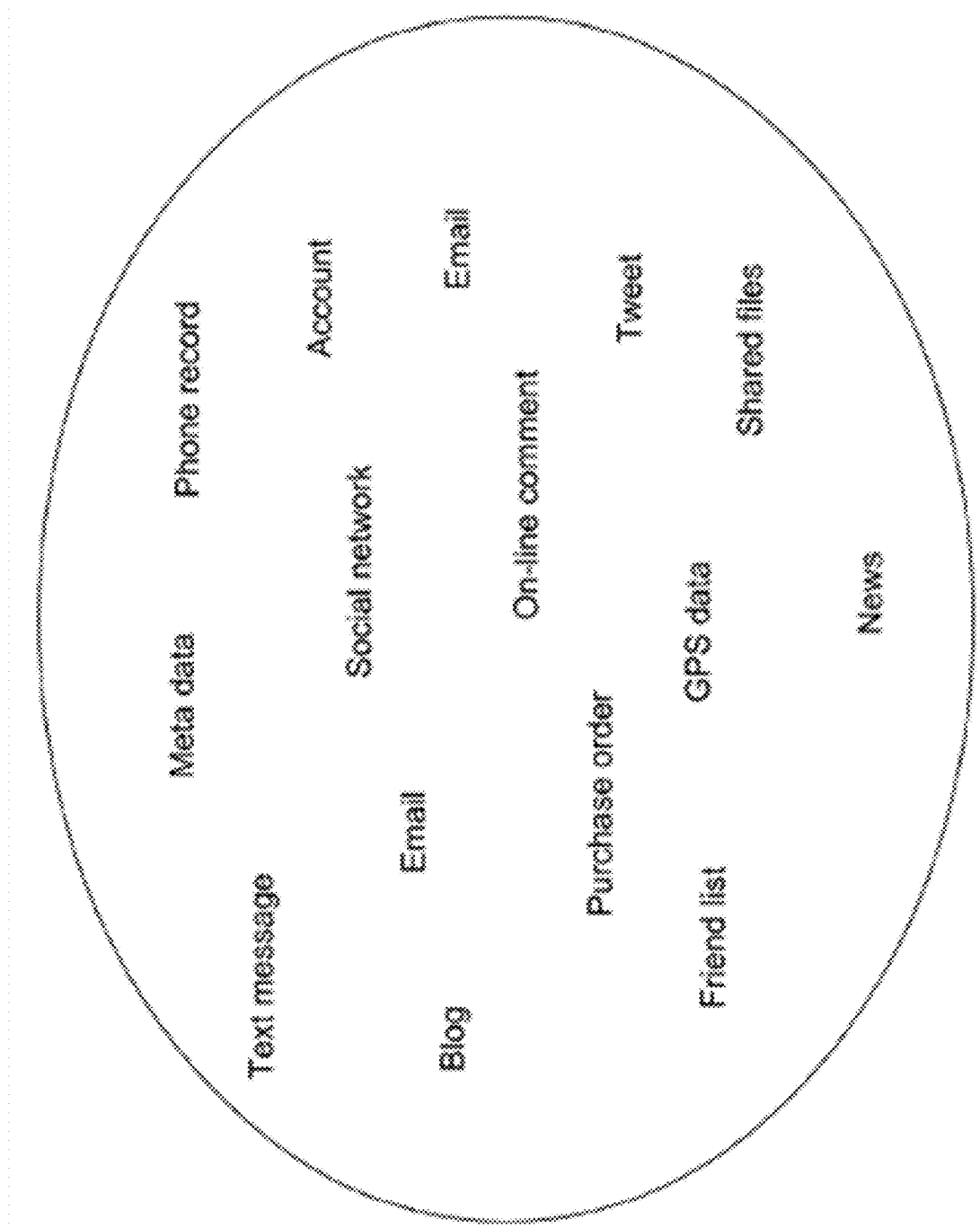
FIG. 3 illustrates an embodiment of a corpus of information.

FIG. 3 illustrates an embodiment of the corpus/body of data/information to be processed by a hypotheses generation method as set forth in the present application. The corpus of data includes a collection of available data sets that may be related to a group, a time period, a political campaign, an economic interest, a personal preference, a geographic area, a social class, or a past/future event. This corpus of data collects all type of data from the global network, either public or private, including digital and non-digital mediums or sources. As shown in FIG. 3, exemplary types of collected data include, emails, meta data, phone records, text messages, account information, social network postings and activities, online comments, purchase orders, blogs, GPS data, files shared with public or friends, friend lists in social platforms, and news articles, and so on without limitation. According to an embodiment, the corpus data includes data obtained by scanning from newspaper, printed report, archived files, books, or personal records. The corpus data may also include structured data from transaction logs. This collection of data, in their original form, may or may not be re-organized and every set of data or every piece of data may be treated as a document.

The value of the data items can be weighted. While all data is of interest, data, depending on their characteristics, namely but not limited to their nature, source of capture, volume, uniqueness, and variance, can have different associated weights. As such, some data are treated as being more valuable than others.

FIG. 4(a) illustrates an embodiment of ontology. According to an embodiment, ontology represents a form of a vector having multiple fields. Depending on user's interests, each field may be assigned an attribute in a way that the vector represents a conception or an abstraction of a generalized and comprehensive description of human interactions, events, interests, or preferences rather than just a particular event. The attribute value can be generic so as to cover the full set of all possible examples and can be semantic so as to be understandable and interpretable by a machine, such as a computer. Exemplary generic descriptions that may be used to assign to the fields may include subject, verb, object, adjective, adverb, preposition, location, climate, mood, time, interaction, human interaction, interest, preference, as well as any other generic attributes. According to an embodiment, the ontology has a hierarchical structure, each hierarchy having a form of a vector of a matrix. In an alternative embodiment, the ontology does not support a hierarchical structure.

Each attribute can be weighted differently depending on its significance. That is, while all attributes comprising the ontology are of interest, some attributes, depending on, but not limited to, their level of generality, can have different associated weights. Thus, some attributes are more valuable than others.

An ontology space generated based on the ontology vector as shown in FIG. 4(a) represents an N dimensional space with each Field(n) representing one dimension. When N is 1, the ontology space has one dimension, which is readily understood by a human being. When N becomes 2 and 3, the ontology space becomes more complicated, but an analyst can still visualize it and comprehend the ontology space. However, when N is greater than 3, going to 4, 5, or even 100 or more, the ontology space becomes so complex that a human analyst will find it difficult-to-impossible intuitively understand the ontology space. Thus, according to one embodiment of the present application, the N-dimensional space is transferred to a lower R-dimensional space, which may be transferred to an even lower S-dimensional space, where S<R<N. According to an embodiment, the N attributes in the ontology vector as shown in FIG. 4(a) may be separated into R groups, where each group represents one dimension, thus reducing the N-dimensional ontology space into an R-dimensional space.

According to an embodiment, the ontology vector as shown in FIG. 4(a) is automatically generated by a computer. An analyst may simply input the corpus of information need to be analyzed and allow the machine to run the analysis by itself. The computer may create ontology vectors from the corpus of information without any specific instructions from the analyst. The computer may create abstraction or representation frameworks based on the genre of the information. In this way, a true comprehensive analysis may be applied to the corpus of information without any restriction by targeted interests of an analyst.

FIG. 4(b) illustrates an embodiment of ontology vector. A vector form having three fields such as (subject, verb, object) is used as a form of ontology to detect all data corresponding to the notion "who did what to whom." More so, such ontology can be, but need not be, produced using strictly automated means using natural language processing tools such as parts of speech taggers. This exemplary ontology can generate many sets of hypotheses in a corpus of information, which may or may not be of particular interest. For example, for an analysis of a set of reports on political violence using the ontology as shown in FIG. 4(b), the following hypotheses may be generated:

1. "Terrorists kill people"
2. "AQAP bombs prime minister"
3. "Late model car with known defect explodes while prime minister riding."

Generally speaking, the 1st hypothesis is likely a true statement, but it is such an apparent and generic statement that it would not likely attract the attention of a human analyst. Thus, the 1st hypothesis is ideally set to a lower priority or rank. The 3rd hypothesis is also potentially true and not an apparent point for an analyst. However, where the 3rd hypothesis is not specifically related to an analyst's inquiry or interest—for example finding a terrorist threat— its rank would not be high for a human analyst. Among all the three hypotheses, an analyst would pay the most attention to the 2nd hypothesis because it is potentially true and not apparent and related to a relatively particular terror attack. Therefore, a hypotheses generation method can be configured not only to generate all hypotheses according to an ontology vector but also rank or weight those hypotheses so as to present the relevant one to a human analyst.

Figure 5:
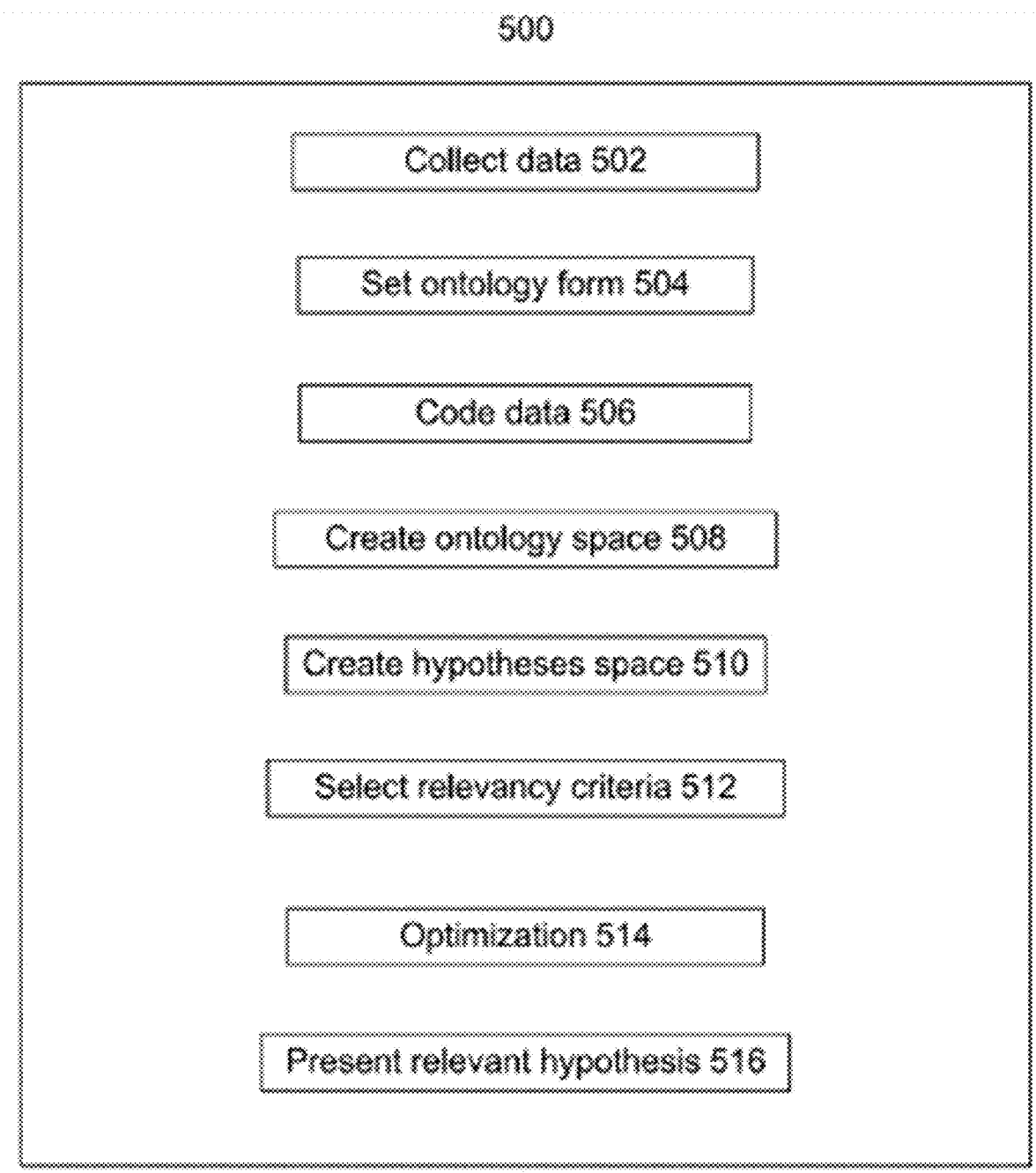
FIG. 5 illustrates an embodiment of a hypothesis generation method.

FIG. 5 illustrates an embodiment of a hypotheses generation method 500. At block 502, the system collects and stores all data and information, either digital or non-digital, that could or would have relevant information for a targeted subject of interest, for example terror attacks or extreme weather. The collected data broadly includes any digitized or searchable data, including data from online, manually-input data, scanned and OCR'ed data from non-digital medium including books, print outs, and magnetic tapes, and structured data from transaction logs. Each set or piece of those collected data may be stored as one document or a combination of those data may be treated as a document or recorded or stored in another digital format known in the art. At block 504, a user defines one or more forms of ontology as an ontology vector(s) for a target subject of interest. For example, a user may use (subject, verb, object) as a form of ontology. According to an embodiment, the forms of ontology are selected by a computer based on the computer's machine learning experience without any interaction from an analyst or user. It is, however, within the scope of the present application for the ontology to be selected by a user or by a combination of a user and machine learning.

At block 506, the system is coded to the collected data according to the attributes assigned to the ontology vectors. The coding may be implemented by humans exclusively or by a computer with human supervision or completely implemented by machines via entity extraction scheme. According to an embodiment, the coding is done for data in different languages and dialects. According to an embodiment, the coding is implemented by parallel computing in which plural machines code the data independently according to techniques known in the art. During the parallel computing process, the corpus of data/information is first mapped onto a platform of multiple machines and then is coded accordingly.

After the data are coded, at block 508 the system is configured to create an ontology space. The ontology space includes all realizations of ontology that is assembled into an ordered multidimensional object such as a two dimensional object. The complete collection of different ontological combinations is referred to as ontology space. For example, a coding of data may show 100 choices for each field of the ontology vector (subject, verb, object). Then, the ontology space in these data includes $100^3=1$ million distinct events. At block 508 the system also populates the ontology space, in which data are classified according to the ontology of the targeted subject of interest. For example, events in documents contained in the corpus of the subject of interest are assigned to corresponding points in the ontology space. According to an embodiment, at block 508 the system is configured to support weighing or biasing certain events. When only a small number of neighborhoods of the total space are populated, the system can handle such sparse data without difficulty.

The completeness of the ontology space depends on the expansiveness of the field of the selected ontology vector. If an attribute is conceptualized at a high level, it is likely to create a more complete ontology space than a more specific one. For example, an attribute of "climate" could create more hypotheses than an attribute of "temperature." According to an embodiment, the completeness degree of the ontology is evaluated by comparing results of different ontology selections because the degree or extent to which the ontology is complete depends on the nature of the ontology, i.e., what it was developed to do or the maturity of the work. In the exemplary ontology vector of (subject, verb, object), the set of all distinct (S, V, O) combinations is the set of distinct hypotheses, which explain events regarding human interactions contained in a corpus. The completeness of this (S, V, O) ontology depends on the number of choices for each triple element, whether the (subject, verb, objet) construct is sufficient to describe events of interest, and whether indirect objects are needed to be captured.

At block 510 the system is configured to create a hypothesis space by transforming the ontology space created in the step 508. The step 510 groups and merges similar and related concepts in ontology space, transforming the ontology space into an ordered hypothesis space. When the specific values coded out of the data have many choices for one field of ontology, many hypotheses may be very similar. For example, in the (S, V, O) ontology, two hypotheses (group, bombed, bunker) and (group, exploded, bunker) are not distinct events based on security interests. According to an embodiment, the merging process may implement clustering techniques including hierarchies, filters/thresholds, topic models, and conditional random fields as known in the art. According to an embodiment, the hypothesis space represents hypotheses that are grouped by relatedness of concepts, in which grouping/merging related concepts in the neighborhood of one another results in a space where position relates to clusters of similar hypotheses. As a result of the grouping/merging process, the hypothesis space can be intuitively perceived by a human analyst. When plural documents are mapped into hypotheses in a particular neighborhood, then a human analyst viewing this clustering could hypothesize that those types of events might have occurred.

The hypothesis space can be organized based on personalized criteria. Depending on an individual's or group's identity or role, the likelihood of novelty and interest of a hypothesis can be estimated. Thus, the ranking of the derived hypotheses can be adjusted to account for these estimates.

At block 512, the system is configured to select relevancy criteria to weighing all the hypotheses. The relevance criteria may be a weighing schema, when applied to the hypotheses, defining a surface in the hypothesis space. The resulting surface has troughs, the depth of which corresponds to hypothesis neighborhood. The depth of the troughs is determined by the weighing schema applied and is interpreted as being related to likelihood of the neighborhood being a relevant set of hypotheses, i.e. the more relevant of the neighborhood, the deeper the trough is. According to an embodiment, the system can be configured to employ a weighing schema, for instance by employing weighting algorithm or module that weighs based on, for example, the frequency of a word or words, parts of speech, thresholding of concepts, and/or exclusions (e.g., excluding proper names or locations). By ranking the relative depths of the resulting N troughs in the hypothesis space, the method can identify a rank list of n, where n is less or equal to N, relevant hypotheses to present to a human analysis for testing. For example, the method may identify the deepest trough, and then the next deepest, and so on.

At block 514, the system is configured to apply an optimization algorithm to find the global and/or local minimum or minima of the hypothesis surface. According to an embodiment, the optimization algorithm in addition to simulated annealing includes, among others, Monte Carlo based or genetic algorithm based approaches as known in the art. According to an embodiment, at block 512, the system is configured to employ a simulated annealing process to find the global and ranked local minima. The simulated annealing process builds an ensemble of simulated annealing runs, each of which corresponds to a random initial point in the hypothesis surface. This simulated annealing process is preferably implemented using parallel computing techniques. The resulting accounting of the N most frequently occupied wells correspond to the rank list of hypotheses potentially explaining the material in the corpus.

According to an embodiment, the simulated annealing process is configured to model a physical process of heating a solid material and then slowly lowering the temperature. The physical process decreases defects in the material and thus minimizes the system energy. In this application, each iteration of the simulated annealing algorithm entails picking a new random point on the surface of interest. The distance of the new point from the current point, or the extent of a hop along the corrugated surface, is based on a probability distribution function that depends upon "temperature." The hop is increased from a small distance to a longer one, similarly to the change of temperature in the corresponding physical process. The algorithm accepts all new points that lower the energy, but also, with a finite probability, points that raise the energy. By accepting some points that raise the energy, the algorithm avoids being trapped in local minima in early iterations and is able to explore globally for better solutions by hopping into potentially lower troughs on the surface that can only be accessed after traversing higher features on the surface.

Random variations or mutations, both in the annealing and genetic processes respectively, can be used to prevent the incorrect determination of a desired solution, namely a hypothesis of limited value, due to local minima effects. Although providing a better solution than its neighboring solutions, better available solutions are missed.

In one embodiment, mutations are guided. At each proposed mutation, the neighborhood can be assessed for fitness. In an annealing process, for example, fitness can be assessed by the rate of change, as exemplified without limitation, the slope of descent or accent. In a genetic process, the fitness of a population member can be computed. Independent of which process, a mutation can be rejected if the mutation results in a hypothesis space that is deemed highly anticipated. Additionally, the rate of mutation can be modified to be a function of the anticipation level of the neighborhood initially in (e.g., a nonlinear mapping, a simple proportional dependence, etc). Still further, the level of anticipation can be based on the profile of the analyst receiving the hypotheses.

Consider the space of all possible hypotheses populated by the machine-coded documents classified according to the ontology. Specifically, in this space there exists a set of clusters defined by vectors pointing from the origin to the different hypotheses implied by the corpus. Consider a distortion of the space in such a way that trivial or un-interesting hypotheses occupy one or more specified regions of the space. Here, "trivial" and "un-interesting" connote hypotheses that a user expects from the data, without the aid of the disclosed embodiments. Given a user profile either entered by the user or determined automatically based on, but not limited to, previous hypotheses considered, or the user's individual or group identity or role, characteristics of "interesting" hypotheses can be determined using known in the art topic models or other information retrieval approaches. These un-interesting clusters (i.e., completely de-weighting such clusters) can be masked or deleted thus directing the search to potentially interesting hypotheses avoiding the un-interesting clusters. Hypotheses identified in the resulting constrained search are, by definition, interesting since un-interesting hypotheses are removed via the optimization algorithm.

By utilizing details of the trajectory of the search, or of the structure of the space itself, interesting hypotheses are identified discriminating them from unintelligible, meaningless hypotheses.

Consider a "hypothesis neighborhood"; that is, the neighborhood in hypothesis space surrounding a given point (i.e., a given hypothesis). Given the previously obtained or determined interests of the user, attributes weights can be established using any of the known information retrieval techniques such as but not limited to uniqueness, as to assessing the interesting hypothesis neighborhoods. Thus, each point can be evaluated in the trajectory of a search to see if that neighborhood has characteristics of an interesting hypothesis. The neighborhood surrounding each point in the search can be summarized to see if the neighborhood possesses the attributes of something near an interesting hypothesis discriminating between interesting and non-interesting hypotheses.

Consider the following illustrative example. For any simulated annealing or similar searching algorithm, at each step in the search, determine if the neighborhood indicates anticipated or trivial hypotheses. If so, then that step is skipped, and the next cycle would effectively direct the search in a different direction, one more likely to produce unanticipated, non-trivial hypotheses.

At block 516, the system is configured to present the selected hypotheses that are relevant to a particular interest or event to a human analyst. According to an embodiment, the system can present specific hypotheses in a textual format to an analyst. According to an embodiment, the system can present a representation of a hypothesis surface to the analyst. According to an embodiment, the system can present a color map representation of the hypotheses to the analyst. On the color map, an identification number of a hypothesis can associated with a color whose brightness indicates ranking of a hypothesis or relevancy of a neighborhood.

FIGS. 6-15 illustrate an embodiment of a hypotheses generation method applied to monitoring natural disasters as a target subject of interest. For an ontology defined by where a disaster hits, what the disaster is, and how it produces damage that is of interest, an ontology vector of {where, what, how} is selected as ontology. A system collects and/or data for news reports on disasters caused by storms in a few metropolitan areas. Table I (FIG. 18) depicts part of a hypothetical corpus of information that could be collected. Table II includes an exemplary computer program used for implementing the method according to an embodiment of the present disclosure. The program in Table II represents an R code. According to an embodiment, the program specifies a hypothetic ontology and generates a hypothetic corpus, hypothetic weights, and a graphical representation of the corresponding weighted hypotheses. Other graphical representations, including heat maps and dendrograms, may also be used. Non-limiting examples of software packages which can readily implement simulated annealing with interpreted languages include: R, Octave, Python, Ruby, and Scilab, Matlab, Mathematica, or other similar programs as known in the art.

After coding the corpus of data as described herein, possibilities for each of the three elements are detected, shown as:

Where: Pittsburgh, Carmichaels, New York, Cincinnati, San Francisco

What: tornado, hurricane, tsunami, storms, earthquake

How: wind, rain, flooding, lightning, shaking

Such ontology can produce 125 potential hypotheses, the first 25 of which are shown in FIG. 6. The collection of distinct combinations defining these hypotheses can be represented in a one dimensional column of ontological triples. Each hypothesis is assigned an identifier, such as a hypothesis number as shown in FIG. 6.

In another example, when news articles from the Internet are collected and their headlines are processed, not only are the interested elements corresponding to one ontology coded, but other potentially interested elements may also be coded, as shown in FIG. 7. The ontology space of the headlines of those articles is shown in FIG. 8. According to an embodiment, the ontology codes may be supplemented by other fields an analyst may be interested in. For example, the analyst may also want to know whether the disaster areas belong to urban or rural areas, coded as a "Type of place" field for the ontology vector, as shown in FIG. 9.

The system can be configured to apply one or more weighing criteria. For example, the system can be configured to apply a relatively simple relevancy criterion or criteria, for example, the frequency of occurrences of the different hypotheses in the corpus. When such a criterion is applied, the weights are assigned to corresponding hypotheses. FIG. 10 shows the weights for the first 24 hypotheses.

Figure 11:
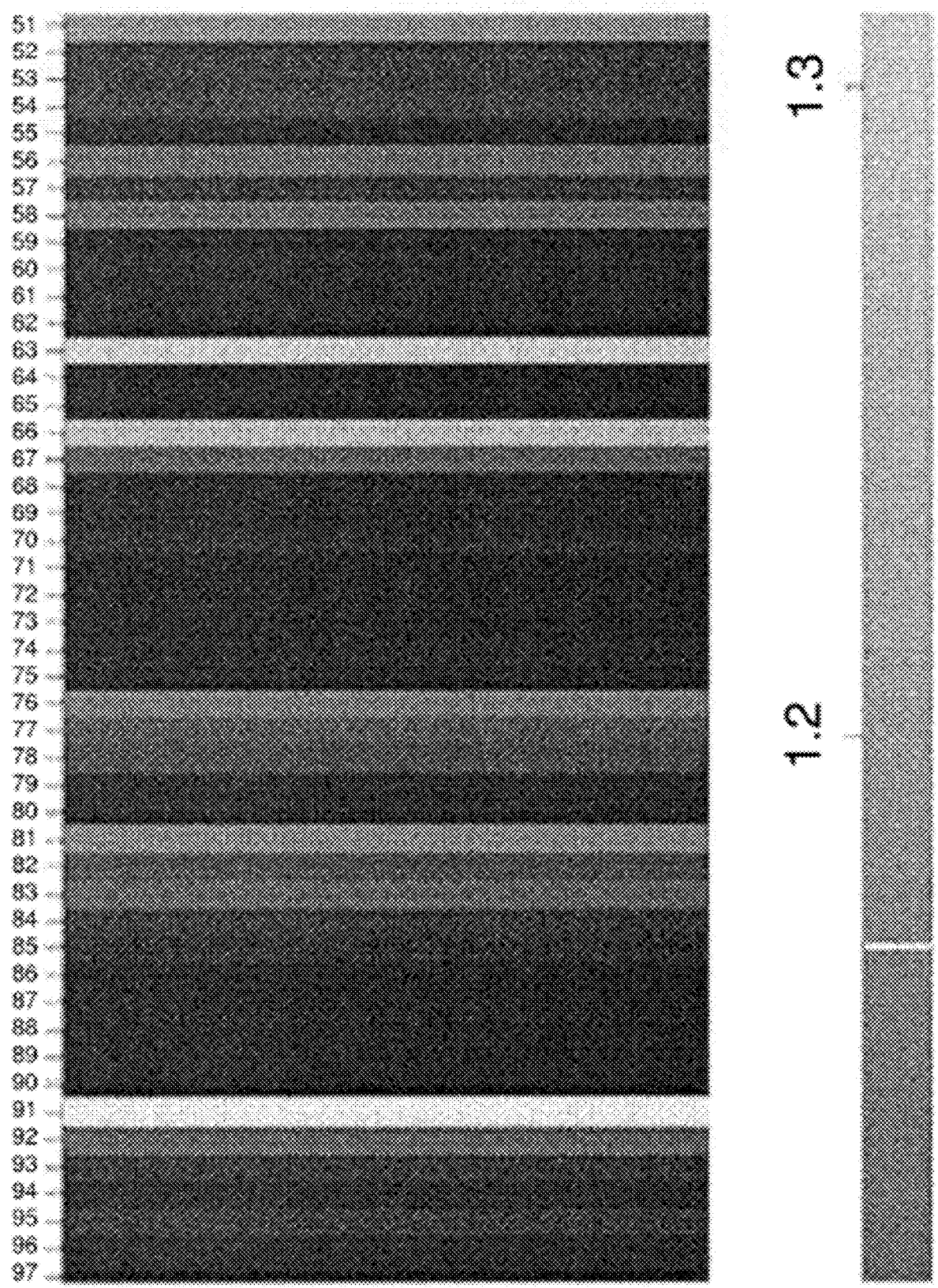
FIG. 11 illustrates an embodiment of a color map of a hypothesis space.

According to an embodiment, the hypothesis space for the entire hypotheses may be represented as a color map, with the brightest color corresponding to the most heavily weighted hypotheses and the darkest color corresponding to the least weighted hypotheses, as shown in FIG. 11. In general, the hypothesis space will be m-dimensional, or a projection of the higher-dimensional space (e.g., via PCA or similar) into a simpler or lower-dimensional space representation.

Figure 12:
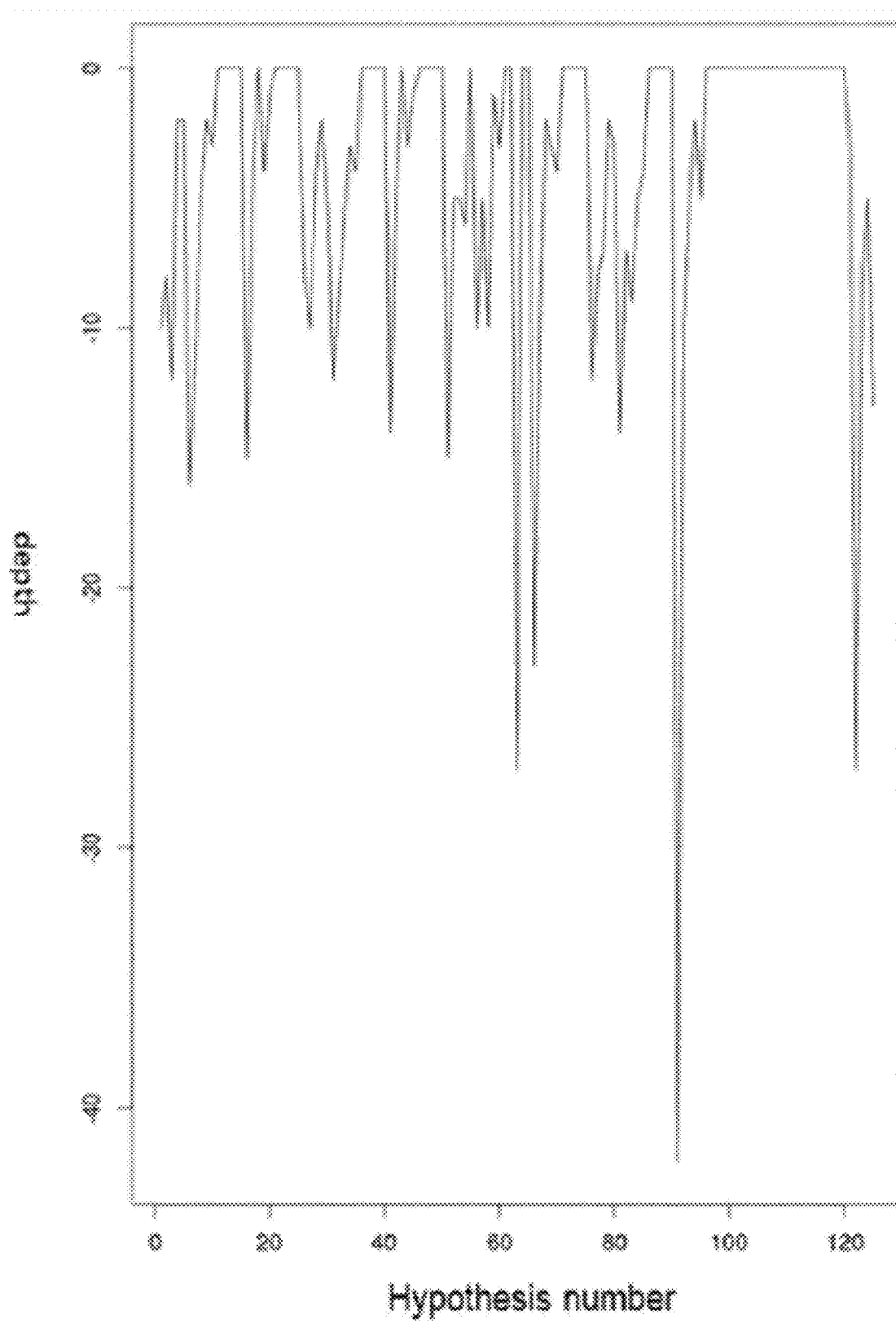
FIG. 12 illustrates an embodiment of a hypothesis surface indicating weighted hypothesis space.

According to an embodiment, the weighted hypotheses form a hypothesis surface as shown in FIG. 12. This hypothesis surface corresponds to a surface with peaks and troughs, where the troughs represent the most highly weighted hypotheses. To apply simulated annealing to find the global minimum of this hypothesis surface, multiple "heating-cooling" cycles may be applied.

Figure 13:
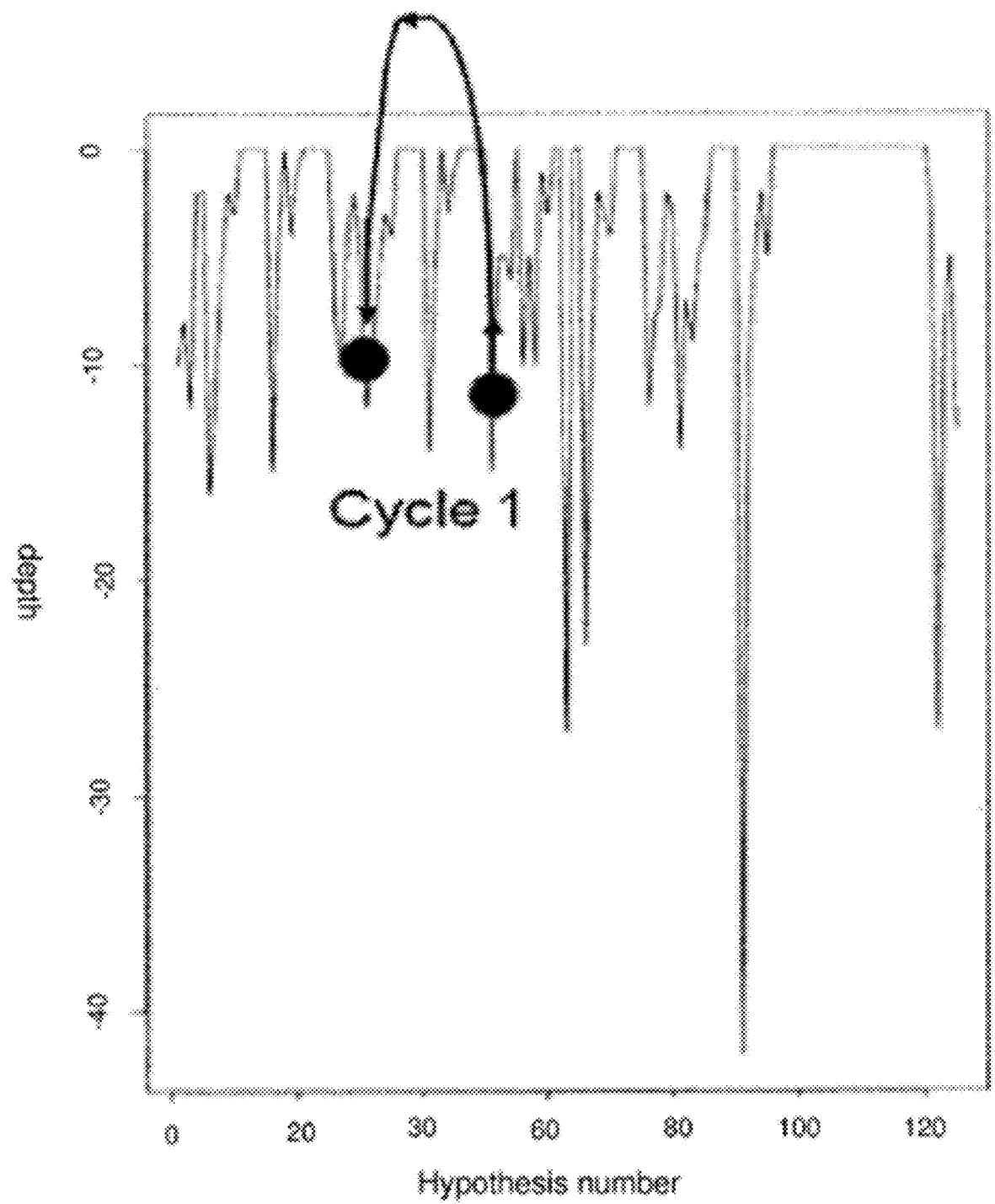
FIG. 13 illustrate an embodiment of a cycle of a simulated annealing process.
Figure 14:
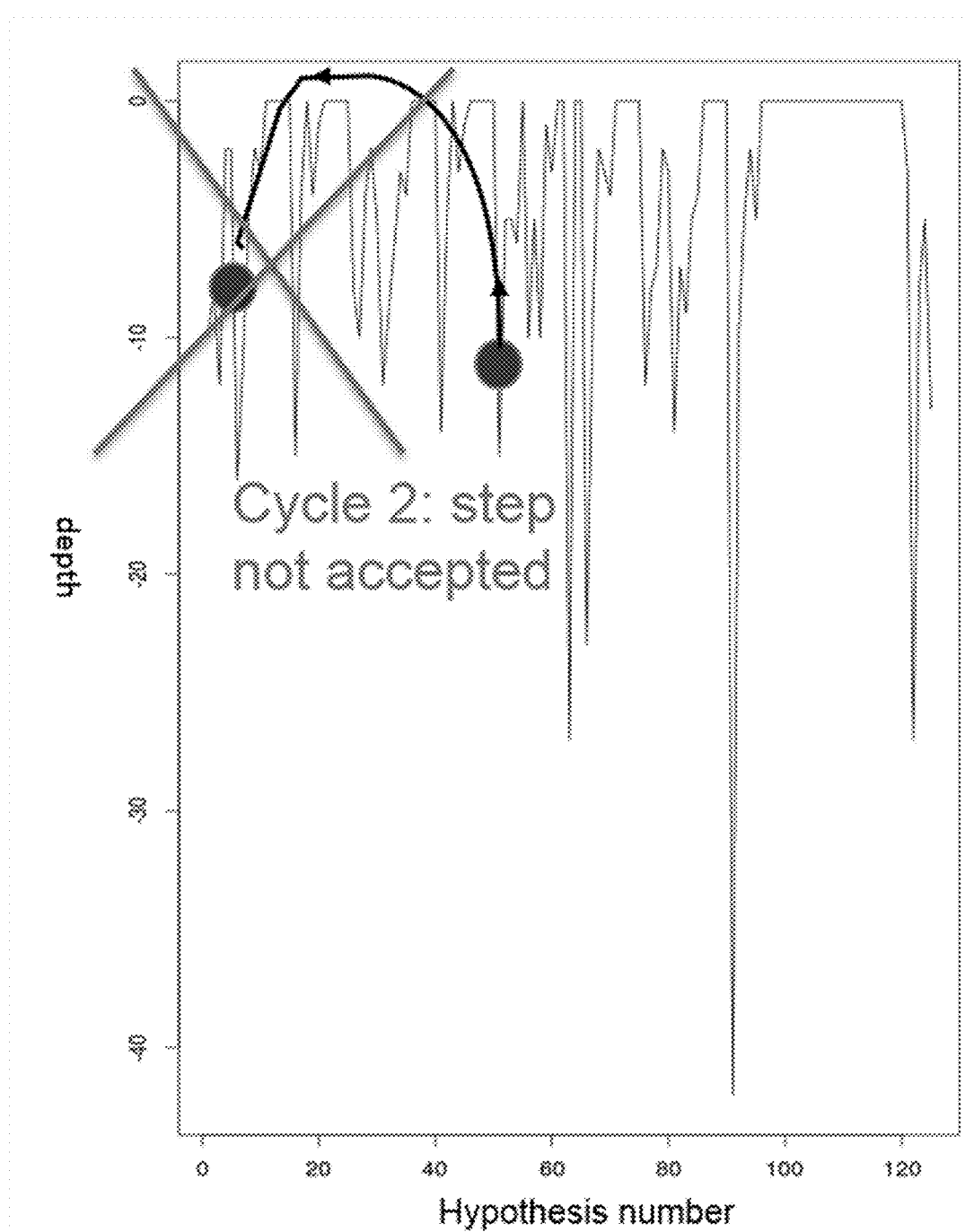
FIG. 14 illustrates an embodiment of a cycle that is rejected in a simulated annealing process.
Figure 15:
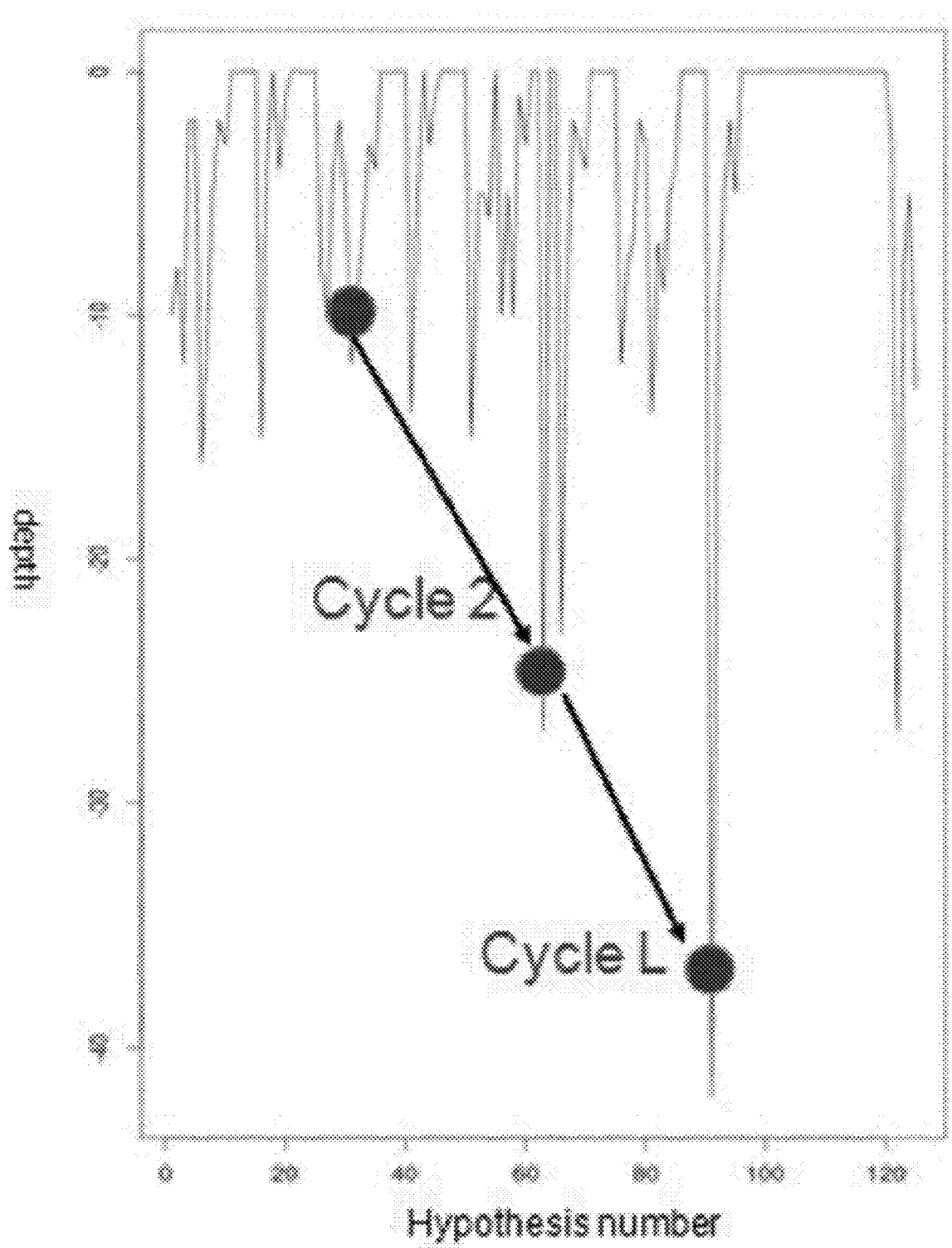
FIG. 15 illustrates an embodiment of a cycle of a simulated annealing process.
Figure 16:
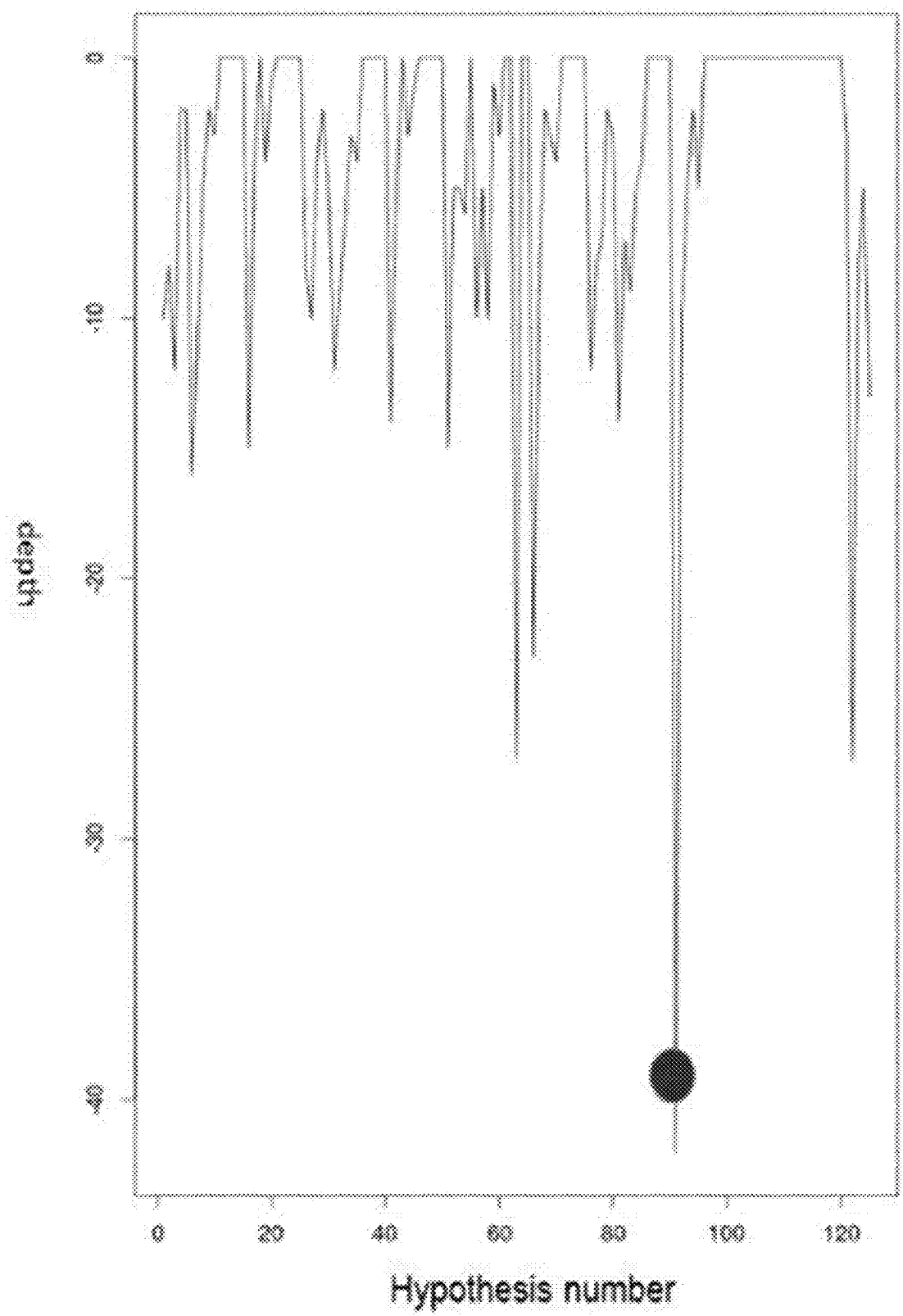
FIG. 16 illustrates an embodiment of a result of a simulated annealing process.

As shown in FIG. 13, the simulated annealing process can be thought of as picking a random hypothesis and placing a ball at that location. By heating the system, the process applies energy to the ball and it hops from hypothesis to hypothesis, landing in some trough (cycle 1). FIG. 14 shows that cycles can be rejected as being not relevant or uninteresting. In a given heating-cooling cycle, the step shown in FIG. 13 may not lead to a neighborhood of interesting hypotheses. Accordingly, the step is rejected. Additional cycles as shown in FIG. 15 allow the ball to hop and land into deeper troughs (cycle 2), until it does not have enough energy to escape (cycle L, in this example). This is identified as a candidate for the most likely hypothesis. According to an embodiment, plural simulated annealing cycles are made to build up rank list of relevant potential hypotheses (FIG. 16). The following is a list of relevant hypotheses selected by this simulated annealing process:

Hypothesis #91, "Pittsburgh storms lightning"
Hypothesis #63, "New York tsunami flooding"
Hypothesis #122, "Carmichaels earthquake shaking"
Hypothesis #66, "Pittsburgh storms flooding"

In this example, the conclusion would be that storms had affected Pittsburgh (#91).

Figure 17:
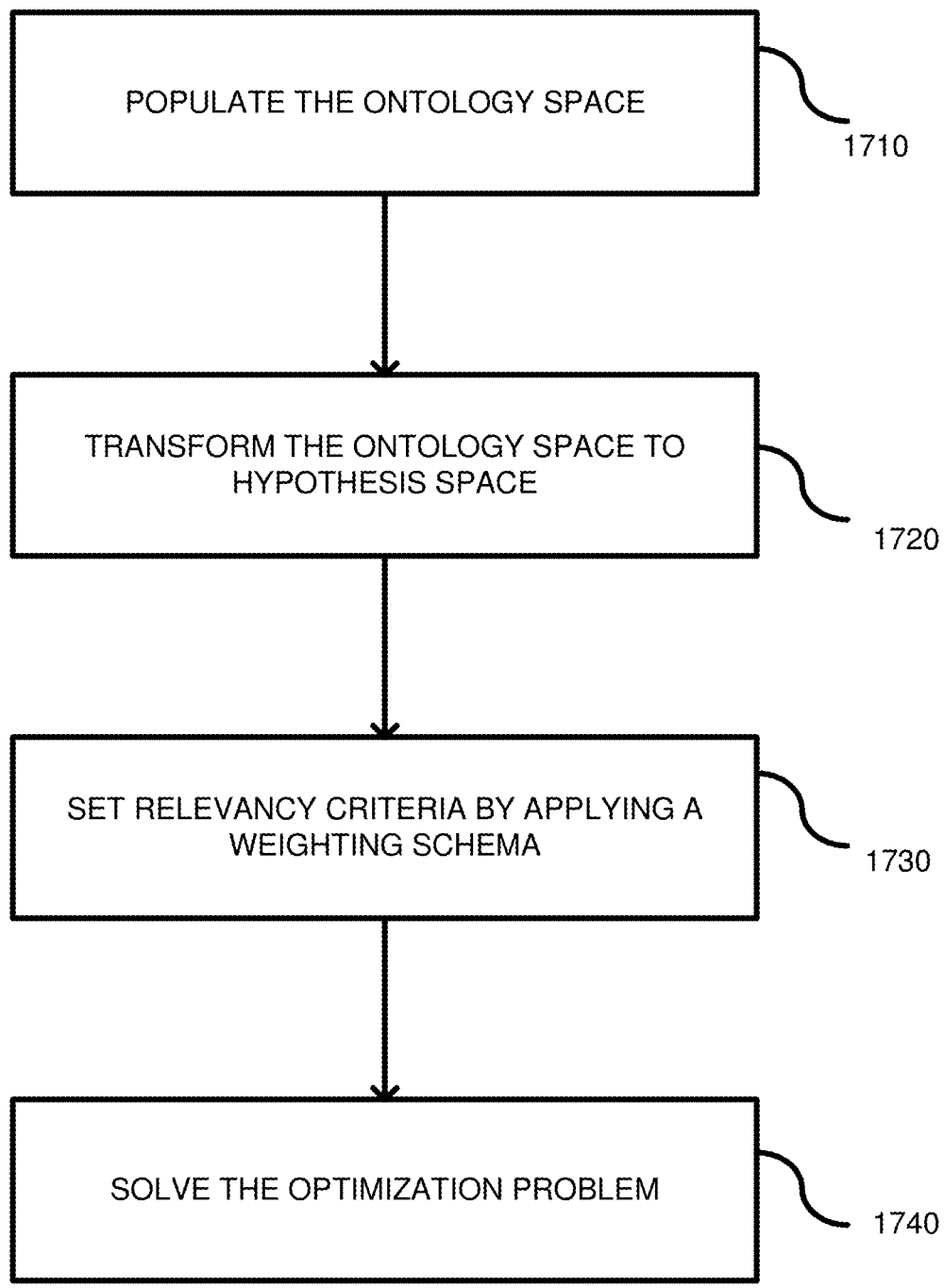
FIG. 17 is a flowchart of a method for hypotheses generation that is optimized and filtered to bias towards a level of potential interest.

FIG. 17 shows a flowchart of a method for generating hypotheses. The goal is to identify hypotheses to explain observed data, which can be included in a plurality of documents. The hypotheses can be a ranked set, and, as discussed further below, the ranked set includes hypotheses considered interesting, while other hypotheses are disregarded. In process block 1710, the ontology space can be populated or otherwise constructed. For example, all realizations of an ontology can be computed and assembled into a multi-dimensional object. The different ontological combinations represent different combinations of identified elements, such as subject, verb, and object elements. The data can be classified according to the ontology of interest. For example, events in documents contained in the corpus of interest can be assigned to the corresponding points in the ontology space. Weighting can then be applied to bias certain supported events.

In process block 1720, the ontology space is transformed into a hypothesis space. Related concepts are grouped and merged to transform the ontology space into an ordered hypothesis space. Approaches for merging include clustering techniques, filters/thresholds, topic models, conditional random fields, etc. The grouping of related concepts in the neighborhood of one another results in a space where position relates to clusters of similar hypotheses. Filtration according to user relevance in a user profile can also be used. Filtration can be performed based on an interest of a user. For example, a user profile can be stored and used for the filtration. The user profile can be generated automatically based on previous hypotheses considered, or the user's individual or group identity or role. Other techniques can be used for determining user interest. Filtering reduces the overall hypothesis space, which potentially increases the speed of processing due to less data being processed.

In process block 1730, the relevancy criteria can be set by applying a weighting schema to define a surface in the hypothesis space. The weighting schema defines a surface in the hypothesis space. The resulting surface has troughs in a simulated annealing representation, the depths of which correspond to hypotheses neighborhoods. The hypothesis space can be represented in terms of a population (in a genetic algorithm representation), with a fitness function used as a weighting function. Possible weighting functions can include one or more of the following: simple word frequency, parts of speech, thresholding, a set of notions not of interest can be excluded (e.g., proper names or locations.) Other weighting functions can also be used. Another weighting scheme ensures that non-trivial and interesting hypotheses are found. Masking or deleting troughs in the simulated annealing context corresponds to trivial and un-interesting neighborhoods being de-weighted. Additionally, deleting a member of the population with a low fitness score in genetic algorithms achieves the same devaluation. The resulting search omits trivial and un-interesting clusters from the search, which speeds the overall analysis. By ranking the relative depths of the resulting troughs in the simulated annealing context and population member fitness in the genetic algorithm context, the ranked list of N (where N is any integer number) relevant hypotheses can be identified. Identifying the deepest trough and then the next deepest trough, etc. is an optimization problem which is known in the art. The ranking can be applied to both trivial/un-interesting and non-trivial/interesting clusters.

In process block 1740, an optimization problem is solved. In one example, simulated annealing can be used to find the global and ranked local minima of the hypothesis surface. An ensemble of simulated annealing runs can be built, each run corresponding to a random initial point in the hypothesis surface. The resulting accounting of the N most frequently occupied wells corresponds to the rank list of hypotheses potentially explaining the material in the corpus. Representative optimization approaches include simulated annealing, genetic algorithms, Monte Carlo, etc. In simulated annealing, a distance from a new point, from a current point, or the extent of a hop along a corrugated surface is based on a probability distribution function that depends on temperature.

At each step in a search trajectory, the neighborhood surrounding that point can be summarized to see if it possesses the attributes of something near an interesting hypothesis. This allows the algorithm to discriminate between interesting and non-interesting hypotheses. If it is near an interesting point, then accept the step. If not, then it can be accepted with a low or zero probability.

The overall method has several advantages, including, but not limited to (1) by masking or deleting hypotheses, the overall processing time is potentially reduced; (2) the method can be performed in real time or near real time and when a simulated annealing approach is used, the hypotheses generation is a highly parallel computation that can be distributed in parallel for computational efficiency; and (3) the method can be performed in any domain for which one or more ontologies are known or can be discovered.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

TABLE II

```
rm{list=1s( )}
#  ----- Define a function for plotting a matrix ----- #
myImagePlot <- function(x, ...){
    min <- min(x)
    max <- max(x)
    yLabels <- rownames(x)
    xLabels <- colnames(x)
    title <-c( )
    #  check for additional function arguments
    if( length(list(...)) ) {
        Lst <- list(...)
        if( !is.null(Lst$zlim) ){
            min <- Lst$zlim[1]
            max <- Lst$zlim[2]
        }
        if( !is.null(Lst$yLabels) ){
            yLabels <- c(Lst$yLabels)
```

TABLE II-continued

```
    }
    if( !is.null(Lst$xLabels) ){
      xLabels <- c(Lst$xLabels)
    }
    if( !is.null(Lst$title) ){
      title <- Lst$title
    }
  }
  # check for null values
  if( is.null(xLabels) ){
     xLabels <- c(1:ncol(x))
  }
  if( is.null(yLabels) ){
     yLabels <- c(1:nrow(x))
  }
  layout(matrix(data=c(1,2), nrow=1, ncol=2), widths=c(4,1),
heights=c(1,1))
  # Red and green range from 0 to 1 while Blue ranges from 1 to 0
  ColorRamp <- rgb( seq(0,1,length=256),   # Red
                    seq(0,1,length=256),   # Green
                    seq(1,0,length=256))   # Blue
  ColorLevels <- seq(min, max, length=length(ColorRamp))
  # Reverse Y axis
  reverse <- nrow(x) : 1
  yLabels <- yLabels[reverse]
  x <- x[reverse,]
  # Data Map
  par(mar = c(3,5,2.5,2))
  image(1:length(xLabels), 1:length(yLabels), t(x), col=ColorRamp, xlab="",
       ylab="", axes=FALSE, zlim=c(min,max))
  if( !is.null(title) ){
    title(main=title)
  }
  axis(BELOW<-1, at=1:length(xLabels), labels=xLabels, cex.axis=0.7)
  axis(LEFT   <-2, at=1:length(yLabels), labels=yLabels, las= HORIZONTAL<-1,
       cex.axis=0.7)
  # Color Scale
  par(mar = c(3,2.5,2.5,2))
  image(1, ColorLevels,
       matrix(data=ColorLevels, ncol=length(ColorLevels),nrow=1),
       col=ColorRamp,
       xlab="",ylab="",
       xaxt="n")
  layout(1)
}
# ----- END plot function ----- #
#============================================================================
============================================
# CODE PART 1: DEVELOP A CORPUS OF DOCUMENTS
# Define the functions that associate city, event, etc based on
probabilities
pick_subject <- function(the_city, Ontology, ProbabilityMatrix){
    if(the_city == Ontology$City[1]){pick_subject <-
as.character(sample(Ontology$Subject, 1, replace = TRUE,
ProbabilityMatrix[,1]))}
    else if(the_city == Ontology$City[2]){pick_subject <-
as.character(sample(Ontology$subject, 1, replace = TRUE,
ProbabilityMatrix[,2]))}
    else if(the_city == Ontology$City[3]){pick_subject <-
as.character(sample(Ontology$Subject, 1, replace = TRUE,
ProbabilityMatrix[,3]))}
    else if(the_city == Ontology$City[4]){pick_subject <-
as.character(sample(Ontology$Subject, 1, replace = TRUE,
ProbabilityMatrix[,4]))}
    else if(the_city == Ontology$City[5]){pick_subject <-
as.character(sample(Ontology$Subject, 1, replace = TRUE,
ProbabilityMatrix[,5]))}
}
pick_cause <- function(the_subject, Ontology, ProbabilityMatrix){
    if(the_subject == Ontology$Subject[1]){pick_cause <-
as.character(sample(Ontology$Cause, 1, replace = TRUE,
ProbabilityMatrix[,1]))}
    else if(the_suject == Ontology$Subject[2]){pick_cause <-
as.character(sample(Ontology$Cause, 1, replace = TRUE,
ProbabilityMatrix[,2]))}
    else if(the_subject == Ontology$Subject[3]){pick_cause <-
as.character(sample(Ontology$Cause, 1, replace = TRUE,
ProbabilityMatrix[,3]))}
    else if(the_subject == Ontology$Subject[4]){pick_cause <-
as.character(sample(Ontology$Cause, 1, replace = TRUE,
```

TABLE II-continued

```
ProbabilityMatrix[,4]))}
    else If(the_subject == Ontology$Subject[5]){pick_cause <-
as.character(sample(Ontology$Cause, 1, replace = TRUE,
ProbabilityMatrix[,5]))}
}
pick_verb <- function(the_cause, Ontology, ProbabilityMatrix){
    if(the_cause = Ontology$Cause[1]){pick_verb <-
as.character(sample(Ontology$Verb, 1, raplaca = TRUE,
ProbabilityMatrix[,1]))}
    else if(the_cause == Ontology$Cause[2]){pick_verb <-
as.character(sample(Ontology$Verb, 1, replace = TRUE,
ProbabilityMatrix[,2]))}
    else if(the_cause == Ontology$Cause[3]){pick_verb <-
as.character(sample(Ontology$Verb, 1, replace = TRUE,
ProbabilityMatrix[,3]))}
    else if(the_cause == Ontology$Cause[4]){pick_verb <-
as.character(sample(Ontology$Verb, 1, replace = TRUE,
ProbabilityMatrix[,4]))}
    else if(the_cause == Ontology$Cause[5]){pick_verb <-
as.character(sample(Ontology$Verb, 1, replace = TRUE,
ProbabilityMatrix[,5]))}
}
pick_object <- function(the_verb, Ontology, ProbabilityMatrix){
    if(the_verb == Ontology$Verb[1]){pick_object <-
as.character(sample(Ontology$Object, 1, replace = TRUE,
ProbabilityMatrix[,1]))}
    else if(the_verb == Ontology$Verb[2]){pick_object <-
as.character(sample(Ontology$Object, 1, replace = TRUE,
ProbabilityMatrix[,2]))}
    else if(the_verb = Ontology$Verb[3]){pick_object <-
as.character(sample(Ontology$Object, 1, replace = TRUE,
ProbabilityMatrix[,3]))}
    else if(the_verb == Ontolagy$Verb[4]){pick_object <-
as.character{sample(Ontology$Object, 1, replace = TRUE,
ProbabilityMatrix[,4])}}
    else if(the_verb == Ontology$Verb[5]){pick_object <-
as.character{sample(Ontology$Object, 1, replace = TRUE,
ProbabilityMatrix[5])}}
}
# Read in the ontology, heirarchy, and material to construct news
headlines
Ontology <-
read.csv("~/Dropbox/Docs/DMH_WhitePapers/2013/EnergyWhitepaper2013/Ontolog
y2.csv")
# Define the probabilities of events and places co-occurring, just to make
it non-trivial
p_subject_j_given_city1 <- c(0.25, 0.25, 0.0, 0.45, 0.05)
p_subject_j_given_city2 <- c(0.25, 0.25, 0.0, 0.25, 0.25)
p_subject_j_given_city3 <- c(0.3,  0.3,  0.3, 0.05, 0.05)
p_subject_j_given_city4 <- c(0.2,  0.2,  0.0, 0.2,  0.2)
p_subject_j_given_city5 <- c(0.2,  0.2,  0.0, 0.2,  0.2)
ProbMatrixSubjectCity <- cbind(p_subject_j_given_city1,
                               p_subject_j_given_city2,
                               p_subject_j_given_city3,
                               p_subject_j_given_city4,
                               p_subject_j_given_city5)
p_cause_j_given_subject1 <- c(0.25, 0.25, 0.25, 0.25, 0.0)
p_cause_j_given_subject2 <- c(0.25, 0.25, 0.25, 0.25, 0.0)
p_cause_j_given_subject3 <- c(0.0, 0.0, 1.0, 0.0, 0.0)
p_cause_j_given_subject4 <- c(0.2, 0.2, 0.2, 0.40, 0.0)
p_cause_j_given_subject5 <- c(0.0, 0.0, 0.0, 0.0, 1.0)
ProbMatrixCauseSubject <- cbind(p_cause_j_given_subject1,
                                p_cause_j_given_subject2,
                                p_cause_j_given_subject3,
                                p_cause_j_given_subject4,
                                p_cause_j_given_subject5)
p_verb_j_given_cause1, <- c(0.5, 0.0, 0.0, 0.0, 0.5)
p_verb_j_given_cause2, <- c(0.0, 1.0, 0.0, 0.0, 0.0)
p_verb_j_given_cause3, <- c(0.3333333, 0.3333333, 0.3333333, 0.0, 0.0)
p_verb_j_given_cause4, <- c(0.0, 0.0, 0.0, 1.0, 0.0)
p_verb_j_given_cause5, <- c(0.0, 0.0, 0.3333333, 0.3333333, 0.3333333)
ProbMatrixVerbCause <- cbind(p_verb_j_given_cause1,
                             p_verb_j_given_cause2,
                             p_verb_j_given_cause3,
                             p_verb_j_given_cause4,
                             p_verb_j_given_cause5)
p_object_j_given_verb1 <- c(0.3333333, 0.3333333, 0.0, 0.3333333, 0.0)
p_object_j_given_verb2 <- c(0.3333333, 0.3333333, 0.0, 0.3333333, 0.0)
p_object_j_given_verb3 <- c(0.2, 0.2, 0.2, 0.2, 0.2)
p_object_j_given_verb4 <- c(0.2, 0.2, 0.2, 0.2, 0.2)
```

TABLE II-continued

```
p_object_j_given_verb5 <- c(0.2, 0.2, 0.2, 0.2, 0.2)
ProbMatrixObjectVerb <- cbind(p_object_j_given_verb1,
                              p_object_j_given_verb2,
                              p_object_j_given_verb3,
                              p_object_j_given_verb4,
                              p_object_j_given_verb5)
# Create a vector of random cities. This is also the number of documents
in the corpus.
how_many_cities_sample <- 500
SampleCity <- as.vector{sample(Ontology$City, how_many_cities_sample,
replace = TRUE, prob=c(0.4, 0.2, 0.2, 0.1, 0.1))}
SampleSource <- as.vector{sample(Ontology$Source, how_many_cities_sample,
replace = TRUE, prob=c(0.2, 0.2, 0.2, 0.2, 0.2))}
# Create the sample vectors
SampleSubject <- 0*c(1:how_many_cities_sample)
SampleCause   <- 0*c(1:how_many_cities_sample)
SampleVerb    <- 0*c(1:how_many_cities_sample)
SampleObject  <- 0*c(1:how_many_cities_sample)
for(i in 1;how_many_cities_sample){
    SampleSubject[i] <- pick-subject(SampleCity[i], Ontology,
ProbMatrixSubjectCity)
    SampleCause[i]  <- pick_cause(SampleSubject[i], Ontology,
ProbMatrixCauseSubject)
    SampleVerb[i]   <- pick_verb(SampleCause[i], Ontology,
ProbMatrixVerbCause)
    SampleObject[i] <- pick_object(SampleVerb[i], Ontology,
ProbMatrixObjectVerb)
}
# Construct a matrix of headlines
HeadlineMatrix <- cbind(SampleSource, SampleCity, SampleSubject,
SampleCause, SampleVerb, SampleObject)
#===========================================================================
==============================================
# CODE PART 2: CODE THE CORPUS
# Define an ontology of (where, why, how)
#   The choices for where include: 5 US places, as contained in the object
Ontology$City
#   The choices for why include: 5 reasons, as contained in the object
Ontology$Subject
#   The choices for how include: 5 modalities, as contained in the object
Ontology$Cause
#   Because the corpus was developed from these choices, coding the corpus
is trivial:
CodeTriple <- cbind(SampleCity, SampleSubject, SampleCause)
# Code higher-level attributes, too. For example, coding rural versus
urban:
Place <-  0*c(1:how_many_cities_sample)
for(i in 1:how_many_cities_sample){
    if{CodeTriple[i,1] == Ontology$City[1]}{    Place[i] <- "urban"} #
Pittsburgh is urban
    else if {CodeTriple[i,1] == Ontology$City[2]}{Place[i] <- "rural"} #
Carmichaels is rural
    else if {CodeTriple[i,1] == Ontology$City[3]}{Place[i] <- "urban"} #  New
York is urban
    else if {CodeTriple[i,1] == Ontology$City[4]}{Place[i] <- "urban"} #
Cincinnati is urban
    else if {CodeTriple[i,1] == Ontology$City[5]}{Place[i] <- "urban"} #  San
Francisco is urbal
}
# Glue on the city to the triple
CodeTripleMarkup <- cbind{CodsTriple, Place}
#===========================================================================
==============================================
# CODE PART 3: CREATE THE ONTOLOGY AND HYPOTHESIS SPACES
(OntologySpace <- expand.grid(Ontology$City, Ontology$Subject,
Ontology$Cause)
# Compute how many of each possible triple actually occurs
Repeats <-   0*c{1:length(OntologySpace[,1])}
for{i in 1:length(OntologySpace[,1])}{
    dummy_sum <- 0
    for {j in 1:length(CodeTriple[,1])}{
      if{(OntologySpace[i,1] == CodeTriple[j,1}} &
          (OntologySpace[i,2] == CodeTriple[j,2]) &
          (OntologySpace[i,3] == CodeTriple[j,3]) == TRUE){
        dummy_sum <- dummy_sum + 1
      }
      Repeats[i] <- dummy_sum
   }
}
OntologySpaceFrequency <- cbind(OntolagySpace, Repeats)
```

TABLE II-continued

```
# Then think about making contour plots or 3D plots of any two of the
three dimensions of the resulting space.
mRepeats <- matrix(Repeats, 125, 3)
myImagePlot(mRepeats)
myImagePlot{1.01**(mRepeats)}
# LOOK AT DEFINING A BETTER COLOR MAP, OR< SAY< ADD 1 AND TAKE LOG OF
FREQUENCE DATA
#   TO IMPROVE VISUAL DYNAMIC RANGE
plot{c(1:length(mRepeats[,1])}, -mRepeats[,1], type="1",
xlab=c("Hypothesis number"))
#heatmap(mRepeats)
#aaa <- 1+mRepeats
#aaa <- matrix(aaa, 15, 25)
#heatmap(aaa)
#heatmap.2(aaa, col=redgreen(75), scale="row", key=T, keysize=1.5,
density.info="none", trace="none",cexCol=0.9, labRow=NA)
```

We claim:

1. A method of identifying hypotheses in a corpus of data, the method comprising:
   receiving an ontology by one or more computers, wherein the ontology includes fields and a plurality of choices for each of the fields such that the ontology includes a plurality of ontology vectors, each ontology vector including one choice for each of the fields;
   receiving the corpus of data by the one or more computers;
   populating the ontology, by the one or more computers, by detecting data from the corpus of data that correspond to each of the ontology vectors;
   plotting the populated ontology vectors in an ontology space by the one or more computers, each dimension of the ontology space being associated with one or more of the fields of the ontology;
   transforming the plotted ontology space into a hypothesis space, by the one or more computers, by grouping the plotted ontology vectors that describe similar and/or related concepts into neighborhoods, wherein each neighborhood represents a hypothesis;
   weighing each of the plotted hypotheses by the one or more computers;
   plotting a hypothesis surface or population in the hypothesis space, by the one or more computers, such that the hypothesis surface has troughs or the population has members, wherein the depth of each trough or fitness of each population member is proportional to the weight of each hypothesis in the hypothesis space; and
   sorting the hypotheses plotted in the hypothesis space, by the one or more computers, by applying an optimization algorithm to find the lowest troughs in the hypothesis surface or fittest population members in the population, wherein the optimization algorithm comprises one of a simulated annealing algorithm, a random walk algorithm, a Monte Carlo-based algorithm, or a genetic algorithm.

2. The method of claim 1, wherein:
   the corpus of data includes a plurality of documents;
   the method further comprises:
      weighting one or more of the documents; and
      weighting the hypotheses based on the weight of the document having data corresponding to the ontology vector representing each hypothesis.

3. The method of claim 2, wherein the weight of each document is based on a source of capture of the document, volume of the document, uniqueness of the document, or variance of the document.

4. The method of claim 1, wherein:
   the form of the ontology includes a weight for each of the N fields; and
   the weight of each hypothesis plotted in the hypothesis space is based at least in part on the weight of the fields of the ontology vectors included in the neighborhood representing the hypothesis.

5. The method of claim 1, wherein the ontology space includes N dimensions and each dimension of the ontology space is associated with one of the N fields of the ontology vectors.

6. The method of claim 1, wherein grouping the plotted ontology vectors and transforming the ontology space comprises:
   separating the N fields of the ontology vectors into R groups; and
   transferring the N-dimensional ontology space into an R-dimensional hypothesis space.

7. The method of claim 1, wherein the optimization algorithm weighs each of the plotted hypotheses in part by:
   storing personalized criteria of a user; and
   filtering the plotted hypotheses to de-weight hypotheses that are trivial or uninteresting to the user.

8. The method of claim 7, wherein the personalized criteria is determined based on hypotheses previously considered by the user.

9. The method of claim 7, further comprising:
   storing the identity or role of the user,
   wherein the personalized criteria is determined based on the identity or role of the user.

10. The method of claim 1, wherein the optimization algorithm de-weights trivial or uninteresting hypotheses by:
    introducing a random variation or mutation into the hypothesis space; identifying a local minima in the varied or mutated hypothesis space; and
    determining an anticipation level of a hypothesis represented by a neighborhood at the local minima.

11. The method of claim 10, wherein:
    the optimization algorithm comprises a simulated annealing algorithm;
    the anticipation level of the hypothesis represented by the neighborhood at the local minima is determined based on the slope of descent or accent into the neighborhood at the local minima; and
    de-weighting trivial or uninteresting hypotheses comprises masking or deleting troughs that correspond to trivial or uninteresting hypotheses.

12. The method of claim 10, wherein:
the optimization algorithm comprises a genetic algorithm;
the anticipation level of the hypothesis represented by the neighborhood at the local minima is determined by using a fitness function to determine a fitness level of a population at the neighborhood; and
de-weighting trivial or uninteresting hypotheses comprises deleting a neighborhood in response to the determined fitness level of the population at the neighborhood.

13. The method of claim 10, wherein a rate of variation or mutation is determined as a function of the anticipation level of an initial neighborhood.

14. The method of claim 1, further comprising:
ranking the sorting hypotheses.

15. The method of claim 14, wherein the hypotheses are sorted based on the path by which the neighborhood representing each hypothesis was discovered by the optimization algorithm.

16. The method of claim 14, wherein the hypotheses are sorted in a stateless manner based only on positions of the neighborhoods representing the hypotheses.

17. A system for identifying hypotheses in a corpus of data, the method comprising:
non-transitory computer readable storage media that stores the corpus of data;
a content server that:
receives an ontology, the ontology including fields and a plurality of choices for each of the fields such that the ontology includes a plurality of ontology vectors, each ontology vector including one choice for each of the fields;
populates the ontology by detecting data from the corpus of data that correspond to each of the ontology vectors;
plots the populated ontology vectors in an ontology space, each dimension of the ontology space being associated with one or more of the fields of the ontology;
transforms the plotted ontology space into a hypothesis space by grouping the plotted ontology vectors that describe similar and/or related concepts into neighborhoods, wherein each neighborhood represents a hypothesis;
weighs each of the hypotheses plotted in the hypothesis space;
plots a hypothesis surface or population in the hypothesis space such that the hypothesis surface has troughs or the population has members, wherein the depth of each trough or fitness of each population member is proportional to the weight of each hypothesis in the hypothesis space; and
sorts the hypotheses plotted in the hypothesis space by applying an optimization algorithm to find the lowest troughs in the hypothesis surface or fittest of population members in the population, wherein the optimization algorithm comprises one of a simulated annealing algorithm, a random walk algorithm, a Monte Carlo-based algorithm, or a genetic algorithm.

\* \* \* \* \*